FIG. 4

INVENTORS
GILMORE T. SCHJELDAHL
HARRY R. CARLSEN
BY CHARLES EUMURIAN

ATTORNEYS

Dec. 2, 1969  G. T. SCHJELDAHL ET AL  3,480,993

MACHINE FOR MOLDING PLASTIC CONTAINERS

Filed May 5, 1967  8 Sheets-Sheet 6

INVENTORS
GILMORE T. SCHJELDAHL
HARRY R. CARLSEN
BY CHARLES EUMURIAN

Carlsen Carlsen & Sturm

ATTORNEYS 3,480,993
MACHINE FOR MOLDING PLASTIC CONTAINERS
Gilmore T. Schjeldahl, Northfield, Harry R. Carlsen, Minneapolis, and Charles Eumurian, St. Paul, Minn., assignors to Giltech Corporation, St. Paul, Minn., a corporation of Minnesota
Filed May 5, 1967, Ser. No. 636,541
Int. Cl. B29d 23/02, 23/03
U.S. Cl. 18—5                                                13 Claims

ABSTRACT OF THE DISCLOSURE

A machine for molding small plastic containers by injecting molten plastic into a plurality of injection molds containing a set of parallel core pins attached to a common head, wherein the injection molds open leaving the injection formed parisons on the core pins and the head is thereafter rotated 180 degrees at which point individual blow molds are closed around the parisons and fluid under pressure is admitted through the pins to expand the parisons to the shape of the blow molds. The head also carries a diametrically opposing set of core pins which are moved between said injection and blow molds alternately with the first set whereby as containers are blown on one set parisons are formed on the other.

BACKGROUND OF THE INVENTION (1) This invention relates to the art of molding plastic containers of polyofins, polystyrene or other thermoplastic resins by the two step process of injecting the molten plastic resin into an injection mold around a core pin to form a parison and then moving the core pin with the parison thereon into a blow mold where fluid under pressure is admitted into the parison through the core pin to expand the parison against the blow mold walls to the desired shape and then ejecting the blown molded product from the pin and mold.

The formation of plastic containers by this method is well known and machines for carrying out the process are shown in United States Patents No. 2,331,702 to Kopitke, No. 2,789,312 to Borer, and No. 2,853,736 to Gussoni. One deficiency with such prior machines lies in the fact that the core pin and mold arrangements are not adapted for multiple simultaneous use with common feeding and operating means for high volume rapid container production. In the present machine an elongated core pin suppor shaft is provided with two diametrically opposing rows of core pins mounted thereon to extend radially with respect to the shaft axis so that one row can be confined in a set of injection molds while the other row is confined in a set of blow molds.

SUMMARY OF THE INVENTION

The invention broadly comprises a machine for making plastic containers wherein a mold assembly has a pair of mold platens, carrying mating injection mold halves on their upper portions and mating blow mold halves on their lower portions, which are mounted on a frame for horizontal separating and closing movement to open and close the molds. A rotary support shaft is disposed parallel to the axis of platen movement intermediate the injection molds and blow molds. This shaft carries diametrically opposed rows of core pins with one row projecting into the injection molds and the other row projecting into the blow molds when said molds are closed. Means are provided for injecting plasticized material into the ejection molds to form parisons on the core pins therein and for simultaneously admitting air into and through the core pins in the blow molds to expand the parisons thereon against the walls of the blow molds. A timer controlled power actuated linkage mechanism opens and closes the platens and molds at preset intervals. This mechanism also includes a drive connection with the rotary support shaft to rotate the shaft 180 degrees on its axis when the molds are open to reverse the positions of the core pin rows between the injection molds and blow molds. Suitable means are also provided for cooling the core pins, injecting air into the core pins while enclosed in the blow molds, and for ejecting the blown containers as the molds are opened.

In the preferred embodiment of the invention shown herein, the machine is provided with two identical mold assemblies such as above described. The platens in both asemblies are all movable on a common horizontal path and are all aligned with each assembly having an inner and an outer platen. The outer platen in each assembly is rigidly connected by slide rods with the inner platen on the other assembly. Accordingly the platens in each assembly and the respective molds carried thereby will be simultaneously opened and closed by the aforesaid power actuated linkage mechanism. This mechanism also has drive connection with the rotary shafts of both assemblies for simultaneous rotary movement thereof.

The machine is designed for use in parallel with other identical machines arranged in alignment and all being fed the plastic material from a common plasticizer. Accordingly the machine is readily adapted for extremely high volume production of the desired containers. It is contemplated for example that a container can be formed on and ejected from each core pin every approximately ten seconds with the result that each machine built as described herein can produce approximately 120 containers per minute. Thus the basic objective of the invention is to provide a compact injection-blow molding machine for manufacturing plastic containers wherein the core pin and mold units are arranged and operated in such a novel manner as to provide maximum container production within minmal space requirements and at minimum per unit initial and operating cost.

BRIEF DESCRIPTION OF THE DRAWINGS

A more specific understanding of the invention and its advantages over the art will be obtained by reading the following specification, reference being made to the accompanying drawings, in which—

Referring now more particularly to the drawings, reference numerals will be used to denote like parts or structural features in the different views. The numeral 30 denotes generally a material injection assembly commonly referred to as a plasticizer. It comprises a base power and control unit 31 which supports one end of an elongated barrel 32 which forms a plasticizing chamber. A hopper 34 for receiving bulk powdered plastic material such as granular polyethylene is mounted on one end of barrel 32 to communicate therewith and a pressure extruder screw (not shown) extends longitudinally through the barrel 32 and is continuously rotated by the drive means denoted in broken lines by the numeral 35. The barrel 32 contains conventional heating units to surround the extruder screw so that the barrel forms a plasticizing chamber. As the polyethylene or other thermoplastic material is advanced by the extruder screw from the hopper 34 through the barrel 32 toward the end 36 thereof, the material is worked under pressure and is heated to render the material plastic in a viscous fluid form.

Figure 2:
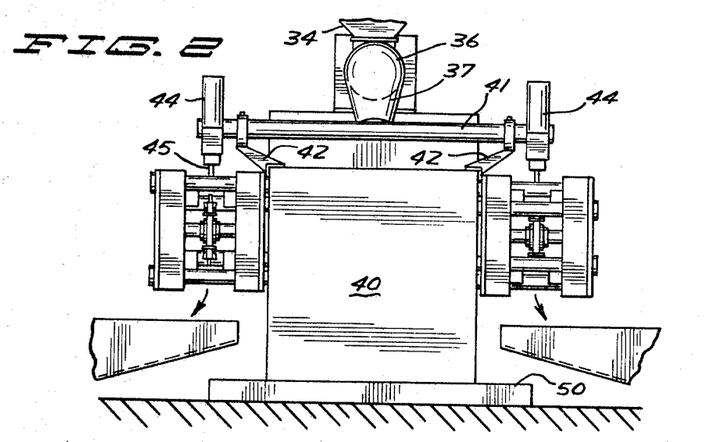
FIG. 2 is an end elevation of the machine.
Figure 3:
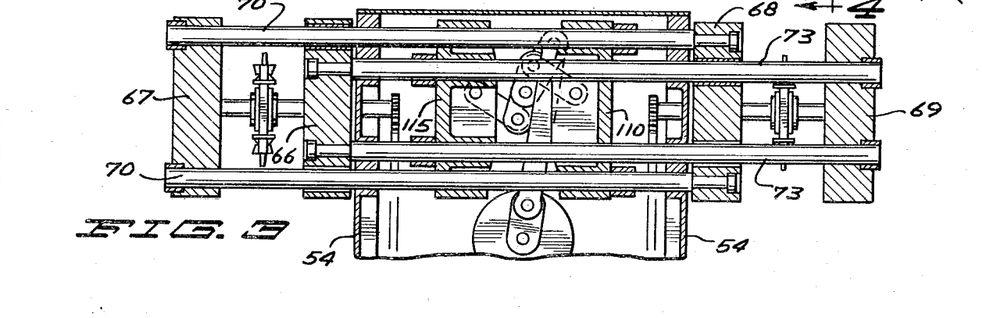
FIG. 3 is a transvrese vertical section through the upper portion of the machine taken on line 3—3 of FIG. 1.

The heated fluid plastic is forced downwardly through conduit 37 and then along and through the tapering conduit 38 which extends over a plurality of identical molding machines each identified generally by the number 40. A transverse feeder line 41 (FIG. 2) extends over each machine 40 having an open connection at its center with the conduit 38. The outer ends of lines 41 are supported by bracket 42 mounted on each machine 40. At each end of line 41 there is mounted an injection device 44.

Figure 4:
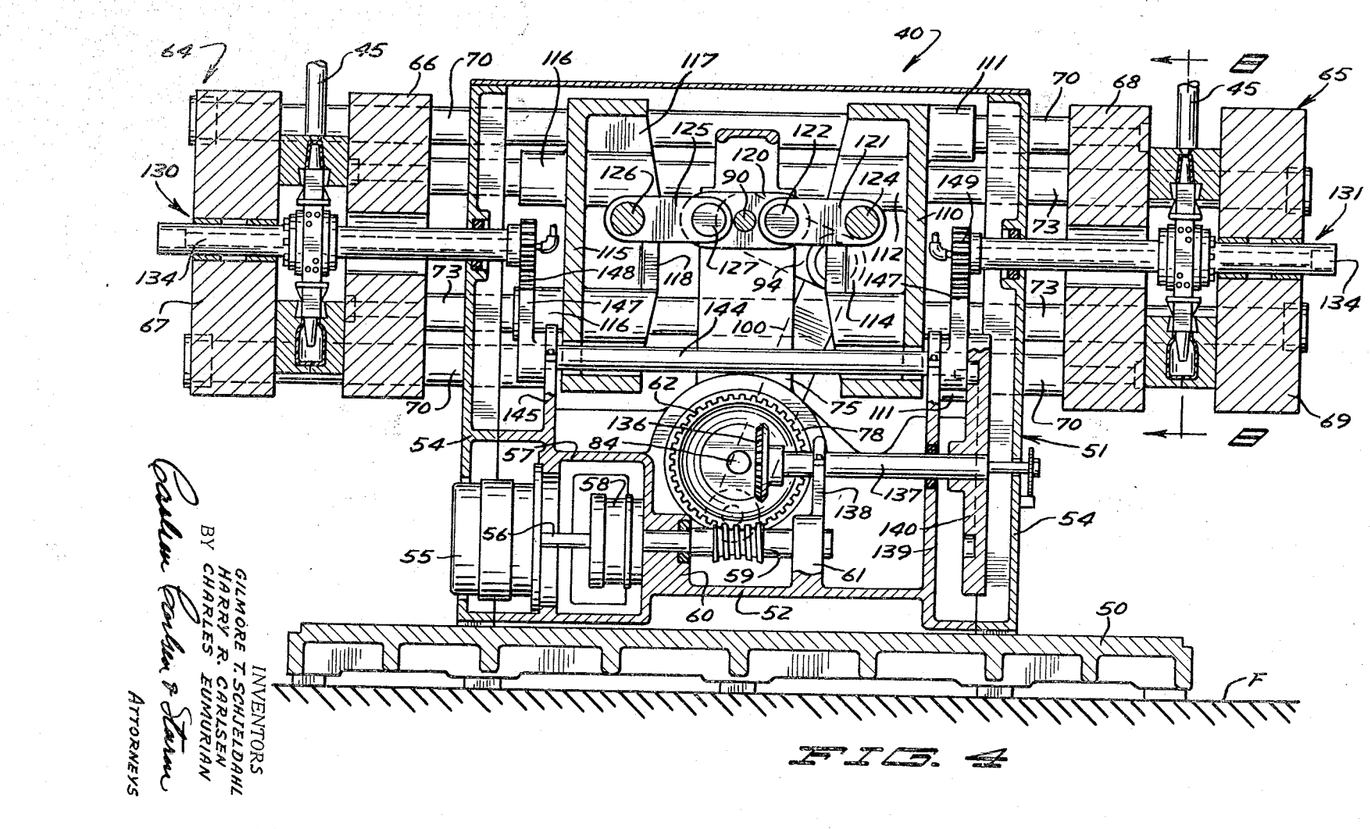
FIG. 4 is a transverse vertical section through the machine taken on line 4—4 of FIG. 1 with the molds in closed condition.
Figure 5:
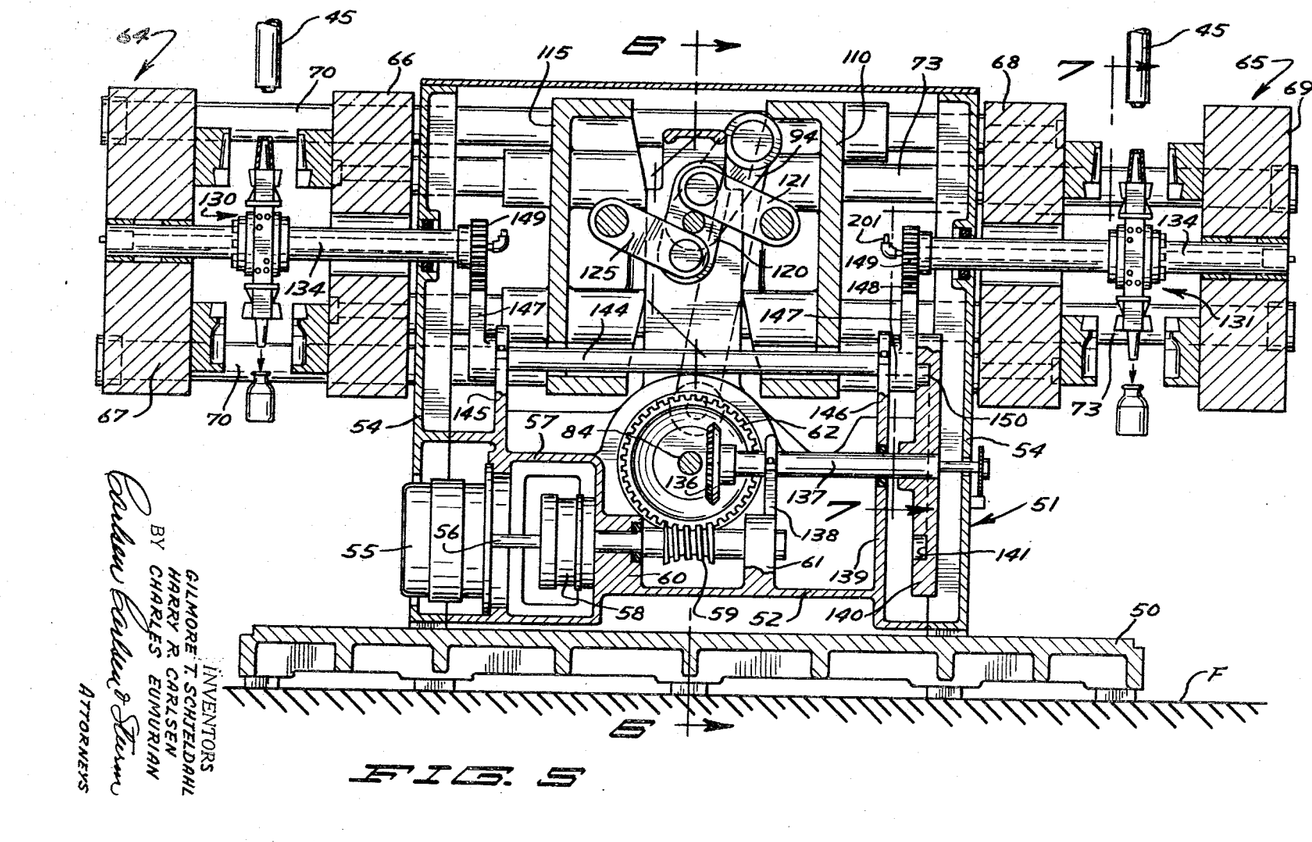
FIG. 5 is similar to FIG. 4 but with the molds in open condition.
Figure 6:
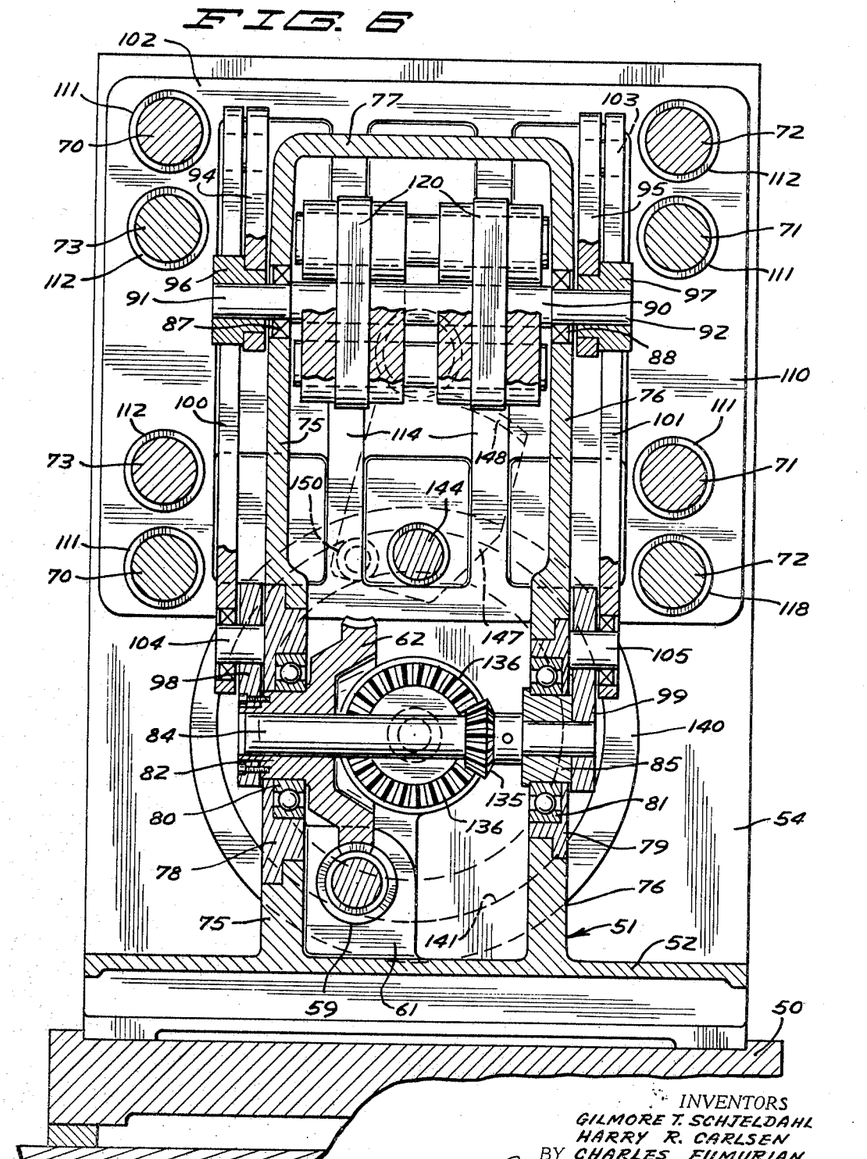
FIG. 6 is a vertical section through the machine taken on line 6—6 of FIG. 5.

Turning now to FIGS. 4, 5 and 6 the basic operating structure of each machine 40 will be described in detail. For purposes of clarity the terms "longitudinal" and "fore and aft" will be used to describe the direction parallel to the extension of barrel 32 while the term "transverse" will be used to describe the direction horizontally perpendicular thereto. A base platform 50 is suitably anchored to the support floor F. A center frame 51 having a bottom 52 integrally connecting upright transversely spaced parallel side walls 54 is mounted on the base 50. A motor 55 is mounted on the frame and has a drive shaft 56 which extends transversely into a housing 57 which encloses a brake and clutch mechanism 58. A curved worm gear 59 has its end portions journaled in frame mounted bearing blocks 60 and 61 and is in driven connection with shaft 56 when the clutch mechanism 58 is engaged. A spur gear 62 mounted on the frame for rotation on a fore and aft axis has several teeth simultaneously enmeshed with the worm gear 59.

The drive mechanism as thus far disclosed is designed to intermittently rotate the gear 62 through one complete revolution. Motor 55 continuously drives shaft 56. Suitable timing mechanism (not shown) operates the brake and clutch mechanism to intermittently engage and disengage the driving connection between shaft 56 and the worm gear 59. When the mechanism 58 is activated by the timer, the worm gear 59 will rotate gear 62 at a constant speed for one complete revolution after which the mechanism 58 will positively brake the gear 59 to stop gear 62 at its initial position, shown in FIG. 4. It is desirable that this complete step take approximately two seconds.

Identical molding assemblies, denoted generally at 64 and 65, are mounted on each side of the machine. Assembly 64 is provided with transversely opposing inner and outer mold support plates or platens 66 and 67 while assembly 65 is provided with similar plates or platens 68 and 69. The outer plate 67 of assembly 64 is integrally connected to the inner plate 68 of assembly 65 by a pair of vertically spaced slide rods 70 which extend between the rear upper and lower corner portions of the plates and a pair of vertically spaced slide rods 71 (FIG. 6) which extend between front portions of the plates. In the same manner the inner plate 66 of assembly 64 is integrally connected to the outer plate 69 of assembly 65 by means of a pair of vertically spaced slide rods 72 (FIG. 6) connecting the upper and lower front corner portions of the plates and a pair of vertically spaced slide rods 73 extending between the rear portions of the plates. All of the rods 70–73 are in horizontal parallelism and are suitably journaled for longitudinal sliding movement through the frame side plates 54.

It will accordingly be understood that the mold support plates 67 and 68 and their interconnecting slide rods 70 and 71 form a first transversely movable unitary carriage and the plates 66 and 69 and their interconnecting slide rods 72 and 73 form a second transversely movable unitary carriage.

The platen carriages are supported and moved by the structure now to be disclosed with attention still being directed primarily to FIGS. 4, 5 and 6. Referring to FIG. 6, it will be noted that the frame 51 has a pair of upright fore and aft spaced parallel standards 75 and 76 extending upwardly from the lower portion 52 thereof. The standards 75 and 76 are integrally joined at their upper ends by a plate 77 to strengthen the frame structure. The bottom portions of the standards 75 and 76 respectively have removable bearing mounting plates 78 and 79 mounted therein which in turn respectively support horizontally and axially aligned bearings 80 and 81. Spur gear 62 has a hub 82 journaled in the bearing 80. A shaft 84 has hub 82 keyed thereto at one end and the other end portion of the shaft carries a collar 85 which is journaled in bearing 81.

With continued reference to FIG. 6, the upper portions of standards 75 and 76 have axially aligned bearings 87 and 88 mounted therein which jointly journal for rotating a shaft 90. The reduced end portions of shaft 90 project beyond the standards 75 and 76 as denoted at 91 and 92. The lower ends of parallel crank arms 94 and 95 are resepctively rigidly connected to the shaft portions 91 and 92 as by the coupling sleeves 96 and 97. A pair of crank arms 98 and 99 are rigidly connected to the ends of shaft 84 which carries gear 62. A pair of parallel main links 100 and 101 have their upper ends respectively and coaxially pivoted to the extended end portions of crank arms 94, 95 as by pivot pins 102 and 103 and their lower ends respectively and coaxially pivoted to the extended end portions of crank arms 98 and 99 as by pivot pins 104 and 105. It will now be understood that as gear 62 is rotated the crank arms 98 and 99 and the lower ends of links 100 and 101 will rotate therewith about the axis of shaft 84. This will cause the links 100 and 101 to move up and down between the positions shown in FIGS. 4 and 5 and accordingly, through the connection afforded by crank arms 94 and 95, cause the shaft 90 to oscillate about its longitudinal axis.

As hereinbefore brought out the platens 67 and 68 and their interconnecting tie rods 70 and 71 form a first unitary carriage. This carriage also includes a vertical connector plate 110 having integral sleeves 111 (FIG. 6) which encircle and are immovbaly secured to the four tie rods 70 and 71. Plate 110 is also provided with sleeves 112 which slidably receive the rods 72 and 73 and a pair of vertical inwardly directed parallel flanges 114. The second carriage formed by platens 66 and 69 and their interconnecting tie rods 72 and 73 includes a vertical connector plate 115 positioned in transversely opposing relation to plate 110 and having a similar construction. It has integral sleeves 116 which encircle and are immovably secured to the four tie rods 72 and 73 and sleeves 117 which slidably receive the rods 70 and 71 of the first carriage. Plate 115 also has a pair of inwardly directed parallel vertical flanges 118 which are transversely aligned with the flanges 114.

A pair of double crank arms 120 are medially fixed on the shaft 90 in respective transverse alignment with and between the flanges 114 and 118. Two pairs of links 121 each connect corresponding ends of arms 120 to the opposing flange 114 as by pivot pins 122 and 124 (FIGS.

4 and 5). In the same manner two pairs of links 125 each connect the other ends of arms 120 to the opposing flange 118 as by pivot pins 126 and 127. The double crank arms 120 and links 121 and 125 accordingly serve as a double toggle linkage for simultaneously opening and closing the two mold assemblies 64 and 65.

The opening and closing operation is best understood by referring to FIGS. 4 and 5. Assuming the machine to be in the closed condition shown in FIG. 4, as clutch 58 is thrown into engagement the worm gear 59 will drive gear 62 through one complete revolution. During this cycle crank arms 98 and 99 will push the main links 100 and 101 upwardly to swing arms 94 and 95 upwardly and rotate shaft 90 and the arms 120 carried thereby a near quarter turn to the position shown in FIG. 5. As the members 120 pivot toward the vertical the links 121 and 125 will pull the plates 110 and 115 toward each other at equal speed and distance causing the mold assemblies 64 and 65 to open.

As the revolution of gear 62 continues the cranks 98 and 99 will then start to move downwardly with resultant reversal of movement of the double toggle linkage toward the position in FIG. 4 so that the assemblies are again closed. It will be noted that in the closed position the links 121 and 125 are in substantial horizontal alignment.

The mold assemblies 64 and 65 respectively include identical core pin head assemblies, designated generally at 130 and 131, each of which is mounted on a tubular rotary support shaft 134. These assemblies 130 and 131 will shortly be described in detail. Of present concern is the means for rotating shafts 134.

A small bevel gear 135 (FIG. 6) is mounted on the shaft 84 and is in meshing engagement with a larger bevel gear 136 keyed to shaft 137 which extends transversely and is journaled in a bracket 138 and an upright plate 139. A cam wheel 140 is mounted on the outer end portion of shaft 137. The gear 136 has a two-to-one circumferential ratio to gear 135. Accordingly upon one complete revolution of gear 135 the gear 136, shaft 137 and cam wheel 140 will turn one-half a revolution. Cam wheel 140 has an eccentric circular groove 141 the center of which is offset vertically from the axis of shaft 137 as best seen in FIG. 6.

Figure 7:
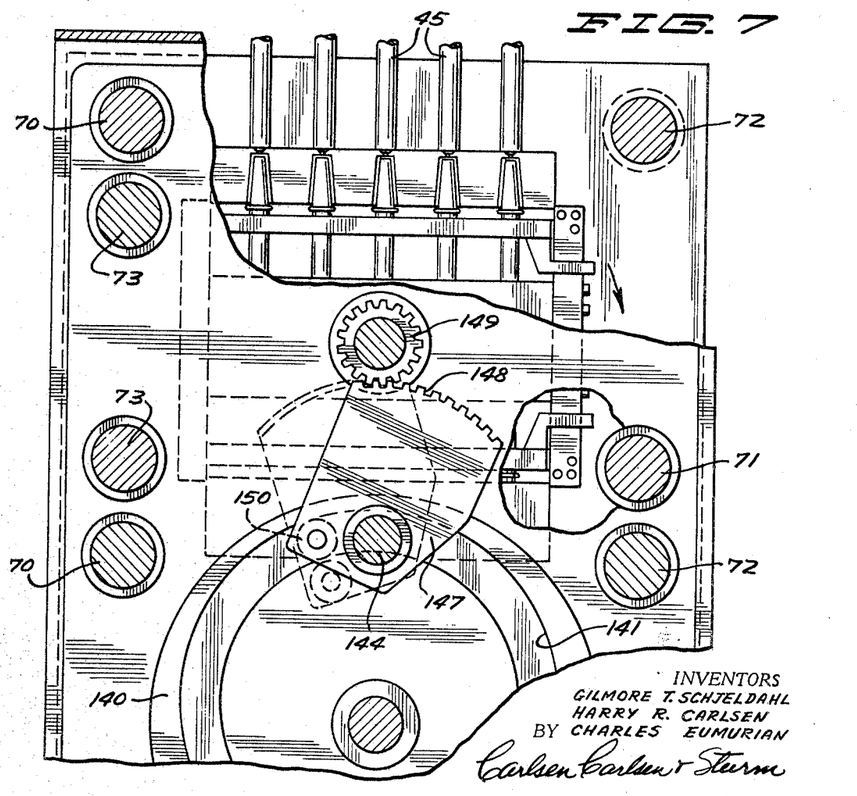
FIG. 7 is an enlarged vertical section taken on line 7—7 of FIG. 5 and with a portion of the mold platen broken away.

A shaft 144 is journaled for oscillating movement in transversely spaced frame portions 145 and 146, the latter being the upper portion of plate 139. A gear segment 147 is secured to each end of shaft 144. This gear segment has a toothed crown 148 meshing with a gear 149 mounted on the inner end of the rotary shaft 134. The segment 147 has a roller 150 (FIGS. 6 and 7) mounted to one side of the segment's connection with shaft 144 with the roller projecting into the groove 141 in the cam wheel 140. The groove is only slightly wider than the diameter of roller 150 so that the roller will track along the side walls of the groove.

It will now be understood that as gear 63 is driven through one complete revolution to open and close the mold assemblies, as previously explained, the rotary shafts 134 will be turned 180 degrees. The gear 135, through the train of gear 136 and shaft 137, will rotate the cam wheel 140 one-half revolution, there being a one-to-two ratio between the meshing gears 135 and 136. As the cam wheel 140 rotates the roller 150 riding in the eccentric groove 141 will cause the gear segments 147, which are interconnected through shaft 144, to rock from the position shown in full lines in FIG. 7 to the position shown in broken lines. With this degree of rocking the teeth 148 will cause gears 149 and their connected shafts 134 to turn 180 degrees about their axes. Upon the following cycle the wheel 140 will be rotated another half revolution and the roller cam 150 will cause the segments 147 to return to their original position rotating the shafts 134 back through 180 degrees. Shafts 134 accordingly oscillate between two fixed positions 180 degrees apart about their longitudinal axes. The curvature of groove 141 is such that the rocking movement of segments 147 will not commence until the mold platens have reached their near open position.

Figure 8:
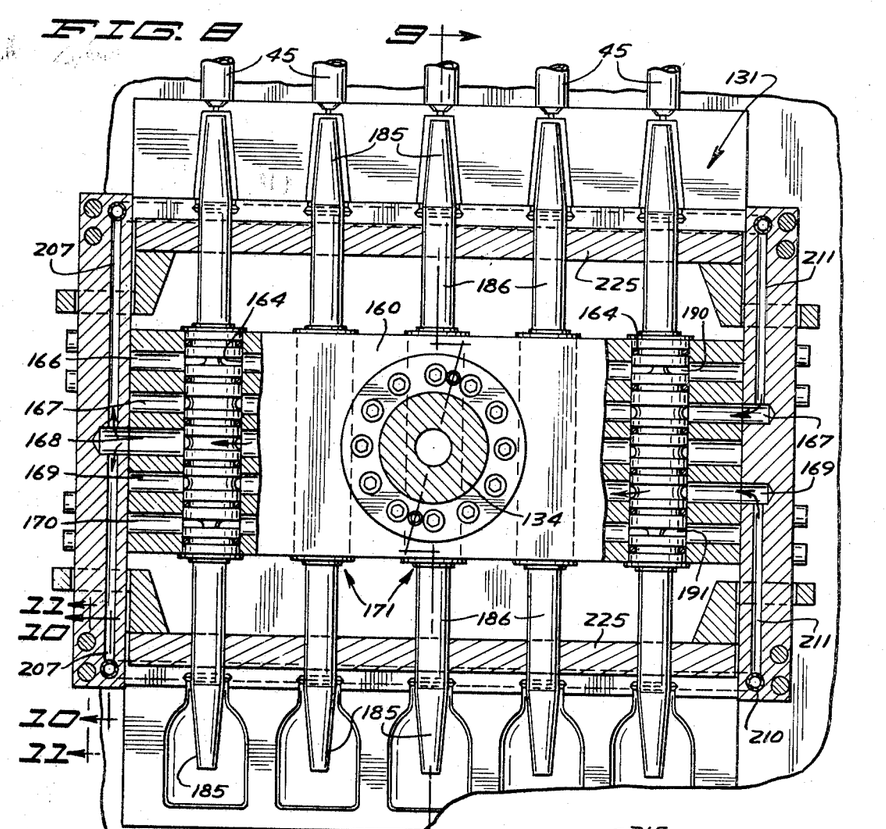
FIG. 8 is an enlarged vertical section taken on line 8—8 of FIG. 4 to show the core pin header in elevation.
Figure 9:
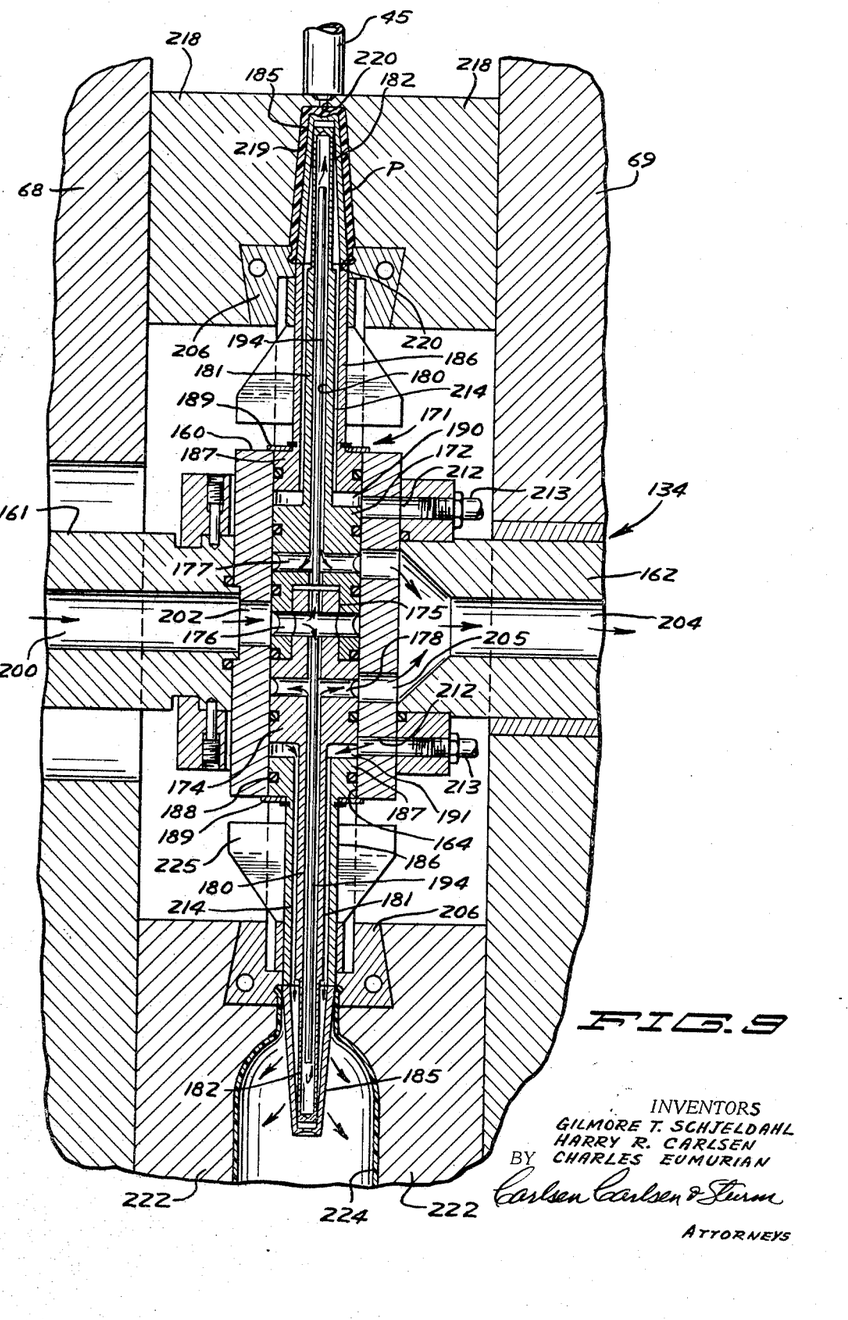
FIG. 9 is a section taken on line 9—9 of FIG. 8.

Turning now to FIGS. 8 through 11 the core pin head assemblies 130 and 131 which are identical in construction will be described in detail. A rectangular header block 160 is mounted centrally on the support shaft 134, the latter actually being formed of two axially aligned sections 161 and 162 which have their adjacent ends suitably secured to the block. Block 160 has five parallel and vertical core pin mounting passageways 164 extending therethrough with their center axes lying on a common plane which is perpendicular to the axis of shaft 134. These passageways 164 are interconnected by five transverse vertically aligned passageways in the block as seen in FIG. 8 and denoted from top to bottom by the numerals 166, 167, 168, 169 and 170.

An elongated double-ended core pin unit designated generally at 171 is immovably mounted in each passageway 164. The construction of each such unit can best be understood by referring to FIG. 9. The unit has a pair of base sections 172 and 174 the inner ends of which are suitably interfitted and interconnected as at 175. An annular groove 176 formed at the center of the unit in sections 172 and 174 is in open communication with passageway 168 in the block 160. Sections 172 and 174 are also respectively provided with annular grooves 177 and 178 which respectively have open communication with passageways 167 and 169.

The base sections 172 and 174 are identical. Each has a center passageway 180 extending axially therethrough. The extended portions of the sections are reduced in diameter to present a tube 181 with a further reduced terminal tube 182. The sections 172 and 174 are provided with peripheral grooves which seat O-rings 184 to provide seals therearound and prohibit the passage of fluid longitudinally through the passageway 164.

A closed end tubular core pin 185 formed of material having minute air-permeable pores, such as disclosed in United States Patent No. 3,170,970 to Adams, encloses each tube 182 and is connected to the block 160 by means of a sleeve 186 having a flange 187 at one end which fits snugly within passage 164. Flange 187 is peripherally grooved and provided with a sealing ring 188 to prevent air leakage between the flange and the wall of passage 164. Washer and snap ring assemblies 189 engage against flange 187 and prohibit endwise movement of the core pin unit 171 in the passageway 164. Members 172 and 174 have portions cut away adjacent their contact with flanges 187 to respectively form passages 190 and 191. Each core pin base section 172 and 174 has an elongated tube 194 secured to the section at groove 176 and extending axially outwardly through passageway 180 to a point just short of the closed end of the terminal tube 182.

The support shaft section 161 has an axial passageway 200 which is connected at its outer end to a liquid inlet coupling 201 (FIG. 4) and which is in open communication at its inner end with groove 176 through a port 202 in the block 160. Support shaft section 162 has an axial passageway 204 which is connected at its outer end with a suitable liquid outlet coupling and is in open communication at its inner end with grooves 177 and 178 through ports 205 and 206 in the block 160. Coupling 201 is connected to a suitable source of coolant liquid such as water under pressure. It will accordingly be understood that cooling medium for the core pins 185 will be constantly flowing through passageway 200, port 202, groove 176, outwardly through tube 194 into the tube terminal 182, then back through passageway 180 to grooves 177 and 178 and out through ports 205 and passageway 204.

Figures 10, 11:
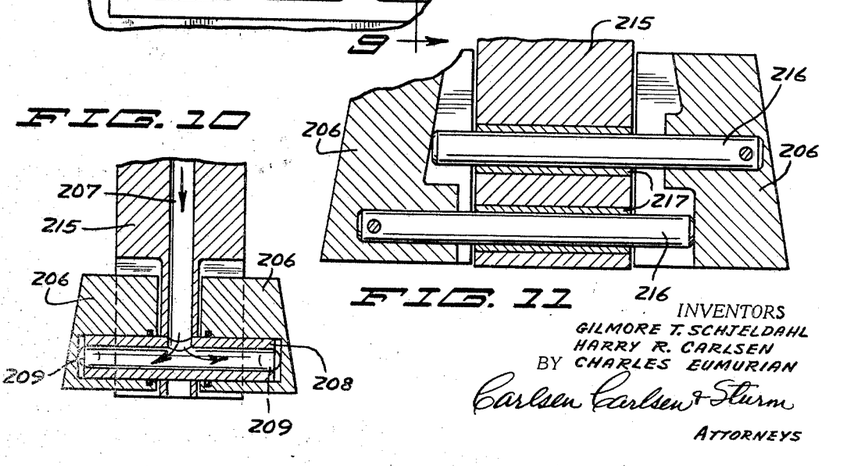
FIG. 10 is an enlarged fragmentary section taken on line 10—10 of FIG. 8.
FIG. 11 is an enlarged fragmentary section taken on line 11—11 of FIG. 8.

A set of neck ring molds 206 are mounted on each sleeve 186 at the inner end of the core pin 185. Suitable mechanism is provided for opening and closing these molds on signal. It will be understood that the passage 168 in block 160 will also be open to the flow of coolant liquid through its open connection with groove 176. Referring them to FIGS. 8 and 10 it will be noted that the block 160 has tapped passageways 207 leading outwardly from one end of passageway 168 and connecting with cross tubes 208 which are slidably associated with the molds 206 (FIG. 10). The molds 206 each has a passageway 209 extending longitudinally therethrough which connect at the opposite end of the molds with a tube 210 mounted in the same manner as tube 208. Tube 210 connects with ducts 211 in block 160, which ducts open into passageways 167 and 169 which in turn connect respectively with grooves 177 and 178. Accordingly the neck ring molds 206 are cooled by coolant moving from the passageway 200 through passageways 168, 207, tubes 208, then passageways 209, tubes 210, passageways 167 and 169 to grooves 177 and 178 which connect with outlet 204.

The block 160 is provided on its outer side with ports 212 which are connected through lines 213 with a suitable source of pressurized air. Ports 212 are in open communication respectively with passages 190 and 191 in the core pin unit. The annular passageway between tube 181 and sleeve 186 is denoted by the numeral 214 and each interconnects the interior of the adjacent core pin 185 with passageway 190 and 191. Accordingly when air is admitted through line 213 it will pass directly into the core pin 185 and then outwardly through the porous wall thereof. It will be understood that such admittance of air under pressure to the core pin is controlled by suitable timing meachnism. It will also be understood by reference to FIG. 8 that the various passageways 190 in each core pin assembly are in intercommunication through passage 166 as are passageways 191 through passage 170.

The neck ring molds are mounted on the header block 160 as shown in FIG. 11. The block has extensions 215 through which the various ducts 207 and 211 extend. These extensions support the molds 206 for opening and closing movement as by pins 216 which are fixed to the molds and slidable in bushings 217.

Referring again to FIG. 9 a pair of complementary injection molds 218 are mounted on the upper portions of platens 68 and 69 to enclose the core pins 185 and provide parison cavities 219 therearound. A sprue opening 220 extends upwardly from each cavity 219 for seating the end of nozzle 45 of the injection device. Molds 218 fit around the neck ring molds 206 and each cavity 219 communicates with the adjacent annular cavity 220 formed by the neck ring molds.

The bottom portions of platens 68 and 69 carry complementary blow molds 222 which jointly forms cavities 224 having the desired shape of the container to be blown. Molds 222 fit tightly around neck ring molds 206 and each cavity 224 communicates with the adjacent neck ring cavity 220.

An ejector bar 225 is mounted on each row of core pin sleeves 186. Suitable mechanism, not here shown, is provided for moving the bar 225 outwardly when molds 222 are open to dislodge blown containers from the core pins 185.

Figures 12, 13:
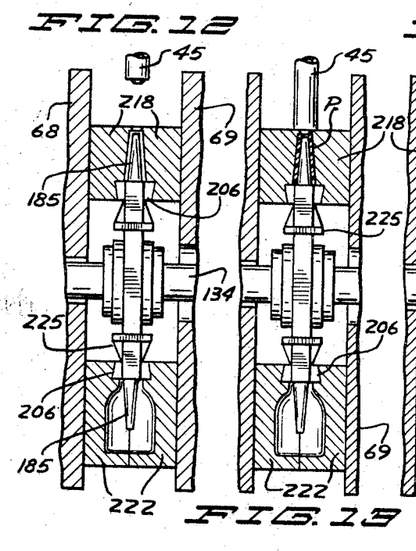
FIGS. 12 through 19 schematically show the various positions of the core pin and mold assembly during operation of the machine.
Figure 14:
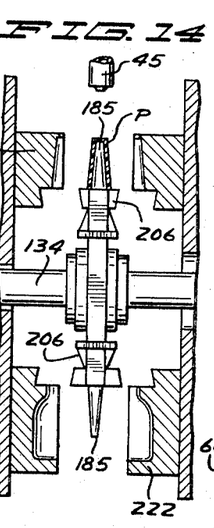
Figure 15:
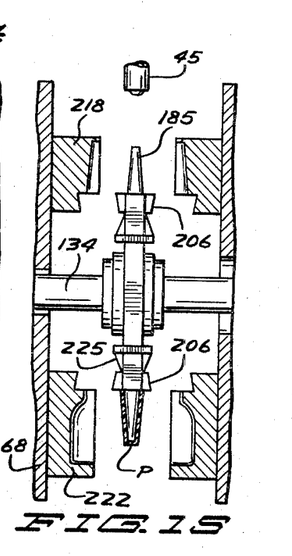

The sequence of operation of the molds is shown in FIGS. 12–19, and is will be understood that the showing is representative of the entire mold sets and series of core pins. In FIG. 12 the molds are closed prior to the initial injection into the parison molds 218. At this point the nozzle 45 is raised or in retracted position and the machine is otherwise in the condition shown in FIG. 4. Nozzle 45 is then lowered as in FIG. 13 and the plastic material is injected through opening 220 into the parison mold cavity 219. This forms a parison P in each cavity 219 as shown in FIG. 13 with neck ring 220 also being filled. The timer then actuates clutch 58 with the result that the operating mechanism moves to the position of FIG. 5 and the molds separate as in FIG. 14. Through the mechanism driving gear 149 the support shaft 134 is rotated 180 degrees reversing the positions of the two rows of core pins to the position shown in FIG. 15. During this movement the neck ring molds 206 remain closed on the parison P. With continuous action of the operating mechanism the molds will be returned to the closed position of FIG. 16 and the nozzles of the injection mechanism are lowered again against molds 218.

Figures 16, 17, 18, 19:
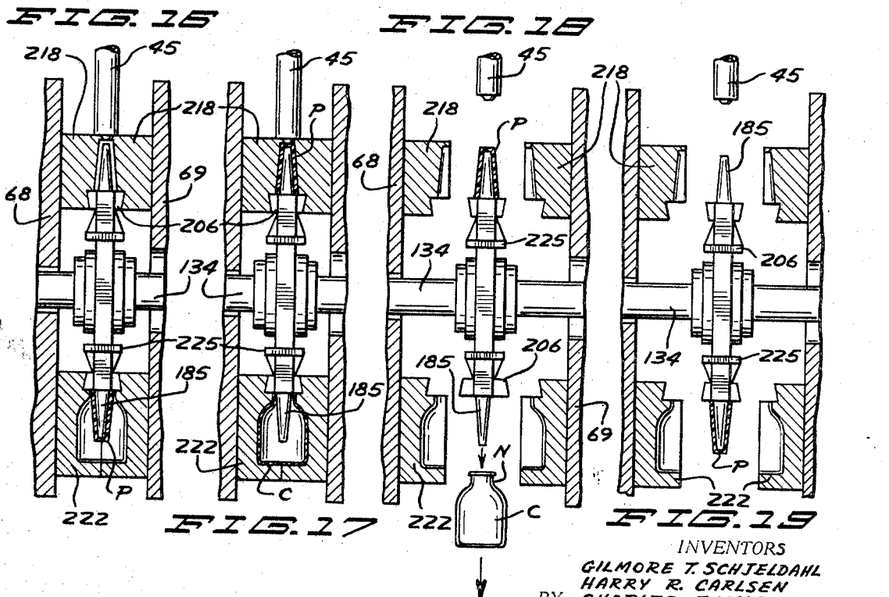

As plastic material is being injected into the molds 218, air is admitted to the core pins 185 positioned in the blow molds 222 inflating the parison against the walls of cavity 224 to form the container C. At this point in the cycle the parisons are in the condition shown in FIG. 17. The timer then again actuates the clutch opening the molds as hereinbefore described. Neck ring molds 206 open with the blow molds 222 to release container C. As the molds are opening and during the initial rotary movement of the shaft 134 the ejector bar 225 is moved outwardly to engage and loosen containers C from the core pins 185 allowing the containers to drop therefrom as shown in FIG. 18. The containers preferably descend through a suitable quality inspection meachnism (not shown) and onto a conveyor (FIG. 2) which carries them off for filling, sealing, packing or the like. As the bottles drop the shaft 134 is rotated 180 degrees to bring the mechanism to the position shown in FIG. 19 prior to reclosing of the molds and the steps are continuously repeated.

The neck ring N of each container C being somewhat thicker than the remaining portions of the container, a slightly longer cooling period for the neck ring is desirable. This is accomplished by the present structure as the neck ring remains in its molds 206 from injection in FIG. 13 until release of the container in FIG. 18.

It is found that the most satisfactory timing of the machine is to allow the molds to be closed for approximately three seconds for the injection and blowing periods. The beginning and the end of this three-second period are depicted in FIGS. 16 and 17. The steps from FIGS. 17 through 18 and 19 and back to FIG. 16, namely, the opening of the molds, ejection of the container C, turning of the core pin head and reclosing the molds, consumes a total of approximately two seconds of time.

Figure 1:
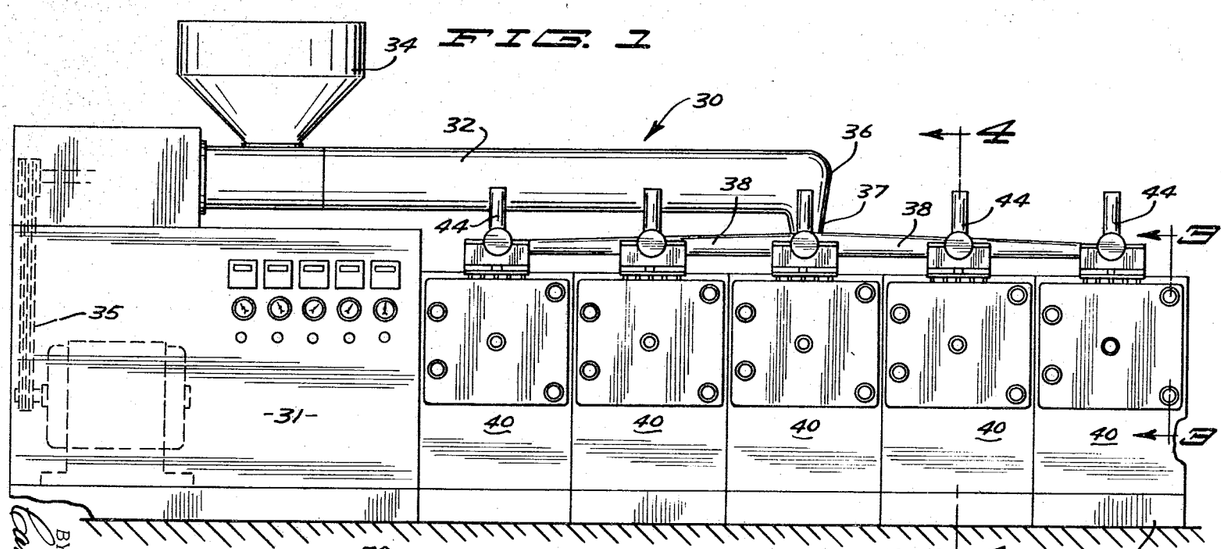
FIG. 1 is an elevation view of a plasticizer in feeding communication with a plurality of container molding machines forming the subject matter of the present invention.

It will accordingly be understood that each double-ended core pin unit 171 will discharge a container C every five seconds. In the form of the invention shown there are five units 171 in each core pin assembly 130 and 131. Accordingly each assembly will complete and discharge five containers every five seconds or sixty containers per minute. With each molding machine 40 having two mold assemblies 64 and 65, each machine will produce 120 bottles per minute with the result that the entire assembly 30 shown in FIG. 1, in which five machines 40 are fed from a common plasticizer, will produce 600 containers per minute.

The high volume production is made possible by the utilization of rows of core pins movable 180 degrees about a common axis between the injection and blow molds so that the injection and blowing steps are constantly and alternately being carried on with relation to each pin.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a machine for molding plastic containers
 (a) a frame,
 (b) a pair of horizontally opposing mold platens mounted on the frame for horizontal movement toward and away from each other,
 (c) an injection mold comprised of two mating half mold sections respectively mounted on said platens,
 (d) a blow mold comprised of two mating half mold sections respectively mounted on said platens in vertical alignment with and vertically spaced below said injection mold sections, (e) an elongated shaft extending horizontally between said platens parallel to the direction of movement thereof and positioned vertically intermediate the injection mold and blow mold, (f) said shaft being journaled on the frame for rotary movement on its longitudinal axis, (g) a core pin header mounted on the shaft between said platens, (h) a pair of core pins extending in diametrically opposing directions from the header and perpendicular to said shaft axis and positioned to be disposed one in each said mold when the molds are closed, (i) means for moving the platens horizontally to open and close the molds, (j) and means for rotating said shaft on its axis to reverse the positions of said core pins when the molds are open.

2. The subject matter of claim 1 wherein the injection mold and blow mold each has a plurality of mold cavities and said header is provided with diametrically opposing rows of said core pins respectively enclosed in said injection and blow mold cavities, each of said rows aligned perpendicular to the longitudinal axis of the shaft.

3. The subject matter of claim 1 wherein said platen moving and shaft rotating means comprises a timer controlled power source mounted on the frame.

4. A machine for molding plastic containers comprising a frame, an elongated core support mounted horizontally on the frame for rotary movement on its longitudinal axis, a first set of core pins projecting upwardly from the support, a second set of core pins projecting downwardly from the support, a first set of molds on the frame arranged in horizontally opposing relation at a first station and adapted to surround said first set of core pins to form parison injection molds therearound, a second set of molds on the frame arranged in horizontally opposing relation at a second station and adapted to surround said second set of core pins to form blow molds therearound, means for injecting plastic into said first set of molds to form parisons therein, means for simultaneously separating and closing said mold sets, means for rotating the core rod support 180 degrees while the mold sets are separated to reverse the stations of said first and second sets of core pins, means for injecting fluid under pressure through said core pins in said second station to inflate the parisons against the walls of blow molds.

5. In a machine for molding plastic containers
(a) a frame,
(b) a pair of horizontally opposing mold platens mounted on the frame,
(c) upper and lower molds mounted on the platens,
(d) the upper mold comprising a pair of complementary mold sections mounted on one each platen and forming a horizontal row of injection mold cavities each opening upwardly through the molds for reception of plasticized material,
(e) the lower mold comprising a pair of complementary mold sections mounted one on each platen and forming a horizontal row of blow mold cavities,
(f) an elongated shaft on the frame extending horizontally through and on an axis perpendicular to the platens between said molds,
(g) two rows of hollow core pins mounted on and extending from the shaft between the platens and in diametrically opposing directions with pins in one row extending one into each injection mold and pins in the other row extending one into each blow mold,
(h) each core pin having means for the passage of air under pressure therethrough,
(i) means for selectively supplying air under pressure to the core pins through the mounted end thereof,
(j) means for supplying plasticized material to the injection molds to form parisons on the core pins therein,
(k) means for relatively separating and closing the platens to simultaneously open and close the upper and lower molds,
(l) and means for rotating the shaft 180 degrees when the molds are open to reverse the positions of the core pin rows between the molds.

6. The subject matter of claim 5 wherein timing means simultaneously activate said air supplying and material supplying means whereby as parisons are formed in the injection molds said air under pressure passes into and through the core pins in the blow mold cavities to inflate the parisons therein against the mold walls.

7. In a machine for molding plastic containers
(a) a frame,
(b) two pairs of mold platens mounted on the frame in horizontally spaced relation,
(c) the mold platens in each pair mounted for horizontal movement toward and away from each other on parallel paths,
(d) an injection mold on each pair comprised of two mating half mold sections respectively mounted on the platens,
(e) a blow mold on each pair comprised of two mating half mold sections respectively mounted on the platens,
(f) an elongated shaft extending horizontally between the platens in each pair parallel to the paths of movement thereof and between said molds,
(g) said shafts being journaled on the frame for rotary movement on their longitudinal axes,
(h) core pins mounted on the shafts and extending radially therefrom into said molds,
(i) a power unit on the frame,
(j) drive means connecting the power unit to said platens to move the platens in each pair away from and toward each other to open and close said molds,
(k) means driven by said power unit to rotate said shafts to move the core pins between molds when the molds are open,
(l) and means for injecting plastic material into the injection molds to form a parison therein and for inflating the parison in the blow molds when the molds are closed.

8. The subject matter of claim 7 wherein said drive means includes a pair of elongated slide rods slidably mounted on the frame and integrally connecting a platen in one pair to a platen in the other.

9. The subject matter of claim 8 wherein each slide rod connects the inner platen in one pair to the outer platen on the other pair.

10. The subject matter of claim 9 wherein each slide rod is connected to a different inner platen.

11. The subject matter of claim 7 wherein a plurality of slide rods interconnect each inner platen with the outer platen in the other pair and slidably extend through the inner platen in said other pair.

12. The subject matter of claim 7 wherein said drive means includes a drive shaft rotated one complete revolution with each complete movement of the molds from closed to open and back to closed condition, and said rotating means being geared to the drive shaft on a one-to-two ratio to rotate said elongated shafts one-half revolution during each complete revolution of the drive shaft.

13. In an assembly for making plastic containers, a control unit including an elongated plasticizer barrel extending horizontally from the control unit in elevated position, a plurality of container making machines arranged in horizontal alignment along and under said barrel, each machine having a pair of mold support platens spaced transversely with respect to the barrel extension, said platens respectively carrying upper injection mold sections and blow mold sections spaced therebelow, a core pin support journaled on a transverse axis between said molds, said support carrying a pair of identical core pins extending therefrom in diametrically opposing vertical direction one into each mold, means for transversely separating and closing said platens to open and close said molds, means for rotating the support 180 degrees when the platens are separated to reverse the positions of the core pins, and conduit means connecting the barrel with each of said injection molds for injecting said molds with plastic when they are in closed position.

References Cited

UNITED STATES PATENTS

| | | |
|---|---|---|
| 2,789,312 | 4/1957 | Borer. |
| 2,853,736 | 9/1958 | Gussoni. |
| 3,069,722 | 12/1962 | Kato. |
| 3,100,913 | 8/1963 | De Matteo. |

FOREIGN PATENTS

| | | |
|---|---|---|
| 18,633 | 10/1962 | Japan. |
| 1,175,418 | 8/1964 | Germany. |

WILBUR L. McBAY, Primary Examiner

U.S. Cl. X.R.

18—20; 264—97